(12) United States Patent
Trang et al.

(10) Patent No.: US 7,774,478 B2
(45) Date of Patent: Aug. 10, 2010

(54) SYSTEM, METHOD, AND DEVICE FOR SCHEDULING A FUTURE TIME FOR A COMMUNICATION SESSION

(75) Inventors: Linh Trang, Akarp (SE); Troed Nils Rickard Sångberg, Malmö (SE); Leland Scott Bloebaum, Cary, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 257 days.

(21) Appl. No.: 11/867,716

(22) Filed: Oct. 5, 2007

(65) Prior Publication Data
US 2009/0077244 A1 Mar. 19, 2009

Related U.S. Application Data

(60) Provisional application No. 60/972,360, filed on Sep. 14, 2007.

(51) Int. Cl.
*G06F 15/16* (2006.01)
(52) U.S. Cl. ...................................... 709/227
(58) Field of Classification Search ................... 709/227
See application file for complete search history.

(56) References Cited

U.S. PATENT DOCUMENTS

| | | | |
|---|---|---|---|
| 5,155,761 A * | 10/1992 | Hammond | 379/88.2 |
| 6,016,478 A * | 1/2000 | Zhang et al. | 705/9 |
| 6,167,379 A * | 12/2000 | Dean et al. | 705/9 |
| 7,117,271 B2 * | 10/2006 | Haverstock et al. | 709/246 |
| 2002/0069249 A1 * | 6/2002 | Pedersen | 709/204 |
| 2006/0177034 A1 * | 8/2006 | Reding et al. | 379/211.02 |
| 2007/0168447 A1 * | 7/2007 | Chen et al. | 709/207 |
| 2009/0063239 A1 * | 3/2009 | Baron et al. | 705/9 |

FOREIGN PATENT DOCUMENTS

WO 2005/107228 A1 11/2005

OTHER PUBLICATIONS

PCT—International Search Report dated Oct. 21, 2008, for Application No. PCT/US2008/059750, Filed Jul. 11, 2008.

\* cited by examiner

*Primary Examiner*—Jeffrey Pwu
*Assistant Examiner*—Farhad Ali
(74) *Attorney, Agent, or Firm*—Coats & Bennett, P.L.L.C.

(57) ABSTRACT

A method for scheduling another time for a communication session when a called party is presently unable or unwilling to accept an incoming call. A first user's communications device receives a request for a communication session from a second user's communications device. Upon failure to accept the request, a server automatically forms a calendar data object, such as in response to receipt of a scheduling trigger message from the first communications device that includes an indication of the failure to accept and an identifier of the second user. The calendar data object includes scheduling information indicating, explicitly and/or implicitly, future time(s) when the first user is available. The calendar data object is sent to either one of the devices, and a time is selected. The server then notifies the other device of the selected time. Corresponding devices are also described.

20 Claims, 5 Drawing Sheets

*FIG. 5*

SYSTEM, METHOD, AND DEVICE FOR SCHEDULING A FUTURE TIME FOR A COMMUNICATION SESSION This application claims benefit of U.S. Provisional Application No. 60/972,360, filed 14 Sep. 2007, the disclosure of which is incorporated herein by reference.

BACKGROUND OF THE INVENTION

The present invention relates generally to communication systems and more particularly to a method for scheduling a future time for a communication session when a called party is presently unable or unwilling to accept an incoming call.

In a communications system, a called party (User B) is occasionally presently unable or unwilling to accept an incoming call from a calling party (User A), but may wish to engage in a communication session with the calling party at a later scheduled time. For example, User B may want to discuss some matter with User A, but User B is currently meeting with an important customer and it would be imprudent to interrupt that meeting to accept an incoming call from User A. Rather than relying on the vagaries of returning User A's call at some indeterminate time in the future, it may be more efficient for User B and User A to jointly schedule a particular time in the future for the call. Once again, interrupting the meeting with the important customer to overtly schedule the subsequent call may be inappropriate. Instead, it may be more beneficial if the scheduling can occur automatically, at least with respect to User B. At present, no such capability exists in the marketplace with respect to such situations. Accordingly, there remains a need for an improved approach to scheduling a time for a subsequent communications session when a called party is unable or unwilling to accept an incoming call.

SUMMARY

The present invention provides a method and device for scheduling a future time for a communication session when a called party is presently unable or unwilling to accept an incoming call. In an exemplary method, a first communications device (e.g., mobile terminal) associated with a first user receives a request for a communication session from a second communications device associated with a second user. In response to a failure to accept the request, a server automatically forms a calendar data object. The calendar data object comprises scheduling information indicating one or more future times when the first user is available for a communication session. The calendar data object is sent to either one of the first or second communications devices, and a time is selected at that communications device. The server then notifies the other communications device of the selected time. The first communications device may automatically send a scheduling trigger message to the server in response to a failure to accept the request from the second communications device, with the scheduling trigger message comprising an indication of the failure to accept and an identifier of the second user. The server may automatically form the calendar data object in response to receipt of the scheduling trigger message.

The server bases the calendar data object on calendar information about at least one of the first and second users, and optionally both. Sources for this calendar information may vary. For example, the server may retrieve calendar information pertaining to at least one of the users, and optionally both, from a separate calendar application server. Alternatively, or in addition thereto, the scheduling trigger message may also comprise information about the first user's future availability for a subsequent communication session with the second user. In addition, users may prioritize other users, and an amount of future "open" times given the calendar data object may be larger if the second user has a greater priority associated therewith.

The various aspects of the invention may be used alone or in any combination, as is desired. In addition, corresponding devices are also described.

DETAILED DESCRIPTION

Figure 1:
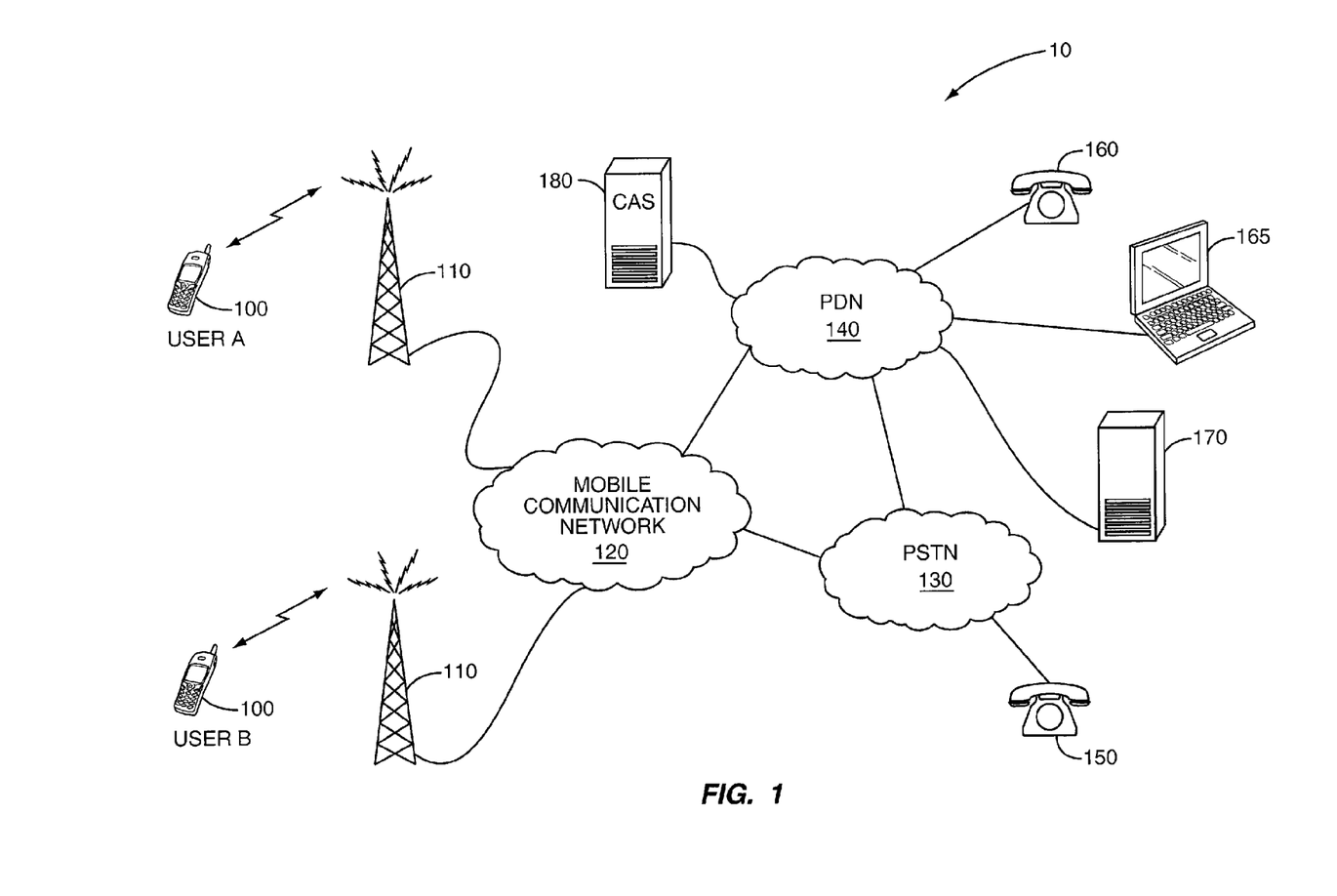
FIG. 1 illustrates an exemplary communication network.

Referring now to the drawings, the present invention will be described in the context of a communication network 10 as shown in FIG. 1. Communication network 10 comprises a mobile communication network 120 having one or more base stations or wireless access points 110 for communicating with mobile terminals 100. Mobile terminals 100 may comprise, for example, cellular telephones, personal digital assistants, laptop computers, or other mobile communications devices. Mobile communication network 120 advantageously connects to the public switched telephone network (PSTN) 130 and to a packet data network (PDN) 140. PSTN 130 is a circuit-switched network providing both voice and data communications, and in particular provides voice service to traditional telephones such as telephone 150. PDN 140 comprises a packet-switched network that implements known protocols, such as conventional Internet protocols, for routing packets of data from one end point to another. PDN 140 may comprise a public or private network, and may be a wide area or local area network. The Internet is one well-known example of a PDN 140. Among the services that may be provided using PDN 140 are packet-switched voice services, such as so-called Voice-over-Internet-Protocol, or VoIP, services. Using VoIP technology, digital devices such as Internet phone 160 may conduct voice calls with other VoIP devices or with traditional phones such as telephone 150.

One or more servers 170,180 are accessible to the mobile terminals 100 via the mobile communication network 120 and/or PDN 140. Servers 170,180 are also available to digital phone 160, as well as to other digital devices such as laptop 165, via PDN 140. The servers 170,180 may, for example, comprise web servers, email servers, file servers, or other types of servers. In some embodiments, server 180 may function as a calendar application server (CAS) 180 that contains calendar information for User A and User B (and typically numerous other users). The servers 170,180 may be accessible to the mobile communications network 120 via the PDN 140, or accessible to the PDN 140 via the mobile communications network 120, or a combination thereof.

Figure 2:
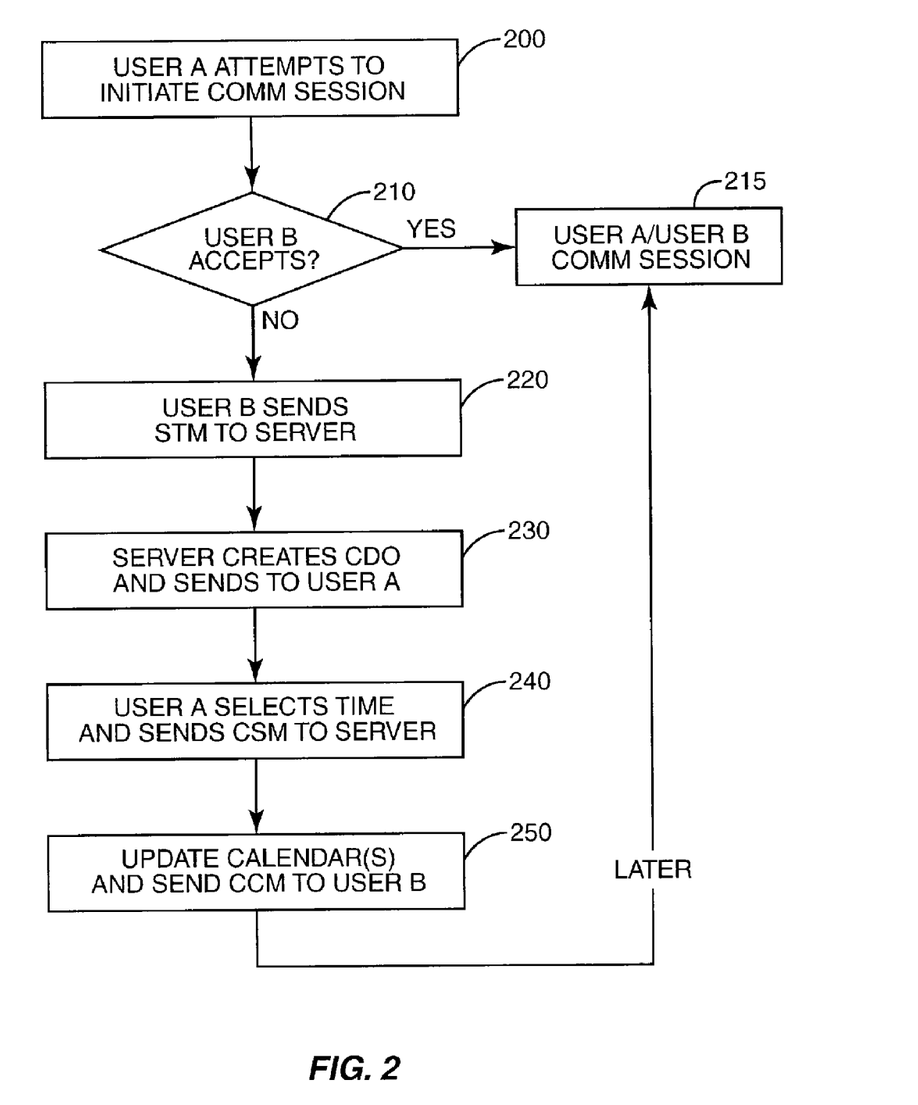
FIG. 2 shows a flow diagram of one or more embodiments of a method for scheduling a future time for a communication session when a called party is presently unable or unwilling to accept an incoming call.
Figure 3:
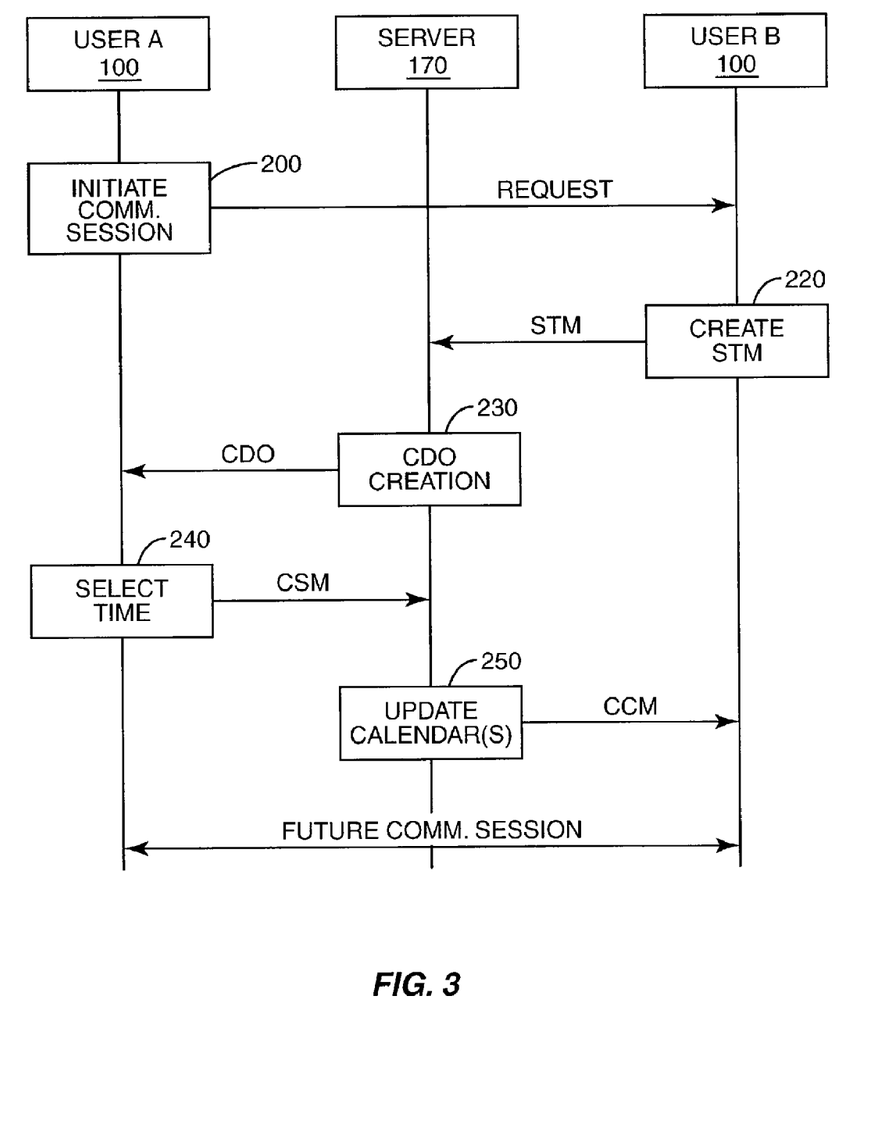
FIG. 3 shows an exemplary signal flow according to one or more embodiments of the invention.

FIG. 2 illustrates a general method for scheduling a time for a communications session when a called party is unable or unwilling to accept an incoming call, and FIG. 3 shows a corresponding signal flow diagram. Although the method illustrated in FIG. 2 is described below with reference to the system components of FIG. 1, those skilled in the art will recognize that the described method is applicable to a variety of systems and network topologies.

The method of FIG. 2 begins with User A attempting to establish a communications session (e.g., a voice call, an instant message exchange, etc.) with User B (step 200). For example, User A utilizes his mobile terminal 100 to place a call to the mobile terminal 100 associated with User B. User A may either accept the request or not accept the request. As shown by decision step 210, if User B accepts the request to establish a communications session, the communication session is established in a conventional manner between the mobile terminals 100 (step 215). However, User B is not always able to accept the request. For example, User B may be unable to accept the request due to being busy with another communication session with another user. Or, User B may be unwilling to accept the call from User A at this time for any of a variety of reasons, and therefore actively declines the request (e.g., actuates a "call reject" button on mobile terminal 100). Either way, a failure to accept the request results in User B's device 100 sending a scheduling trigger message (STM) to server 170 (step 220). The STM comprises an indication of the triggering event, an indication of the calling party (User A); and optionally either a self-identification or information about User B's future availability for a communications session with User A.

Server 170 receives the STM and, based thereon, creates a calendar data object (CDO) that contains information about User B's future availability for a communications session with User A (step 230), and sufficient information to identify User B to User A. In some embodiments, the STM from User B contains scheduling information indicating which times are available which the server 170 uses to compose the CDO. In other embodiments, server 170 accesses the necessary scheduling information from other sources. For example, server 170 may contact calendar application server (CAS) 180 that contains the calendars for User A and User B, using the identification information supplied in the STM to identify the scheduling information to be retrieved. CAS 180 advantageously contains calendar information (e.g., existing appointment times, expected durations, locations, reminder preferences, preferred meeting methods, and the like) for User A and User B, among others, similar to the type of information used by the program sold under the trademark OUTLOOK by Microsoft Corporation of Redmond, Wash. Of course, CAS 180 may act as a CAS for User A, but not User B, or vice versa. In some embodiments, the CAS functionality may be external to server 170 (as shown in FIG. 1); in other embodiments, the CAS functionality may be internal to server 170. If CAS functionality is external to server 170, CAS 180 supplies the necessary calendar information to server 170 to determine available times. Of CAS functionality is internal to server 170, server 170 retrieves the necessary calendar information from internal storage. Note that for ease of illustration, FIG. 2 and FIG. 3 assume that the CAS functionality for both User A and User B is internal to server 170.

Server 170 creates the CDO, which contains information about User B's future availability for the communications session with User A. More particularly, the CDO contains scheduling information indicating one or more future times when User B is available for a communications session with User A. The available times may be identified explicitly in the CDO, such as a list of available times, or the available times may be identified implicitly, such as a listing of times that are unavailable from which available times may be derived, or some combination of the two. All such arrangements are considered, for purposes herein, to be examples of scheduling information that indicates one or more future times when User B is available for a communications session with User A.

In addition, it should be noted that in some embodiments, server 170 may create the CDO based solely on User B's future availability, while in other embodiments, server 170 may create the CDO based on the common availability of User A and User B. Thus, in one embodiment, the CDO is a list of proposed times that both User A and User B are not otherwise scheduled, while in other embodiments, the CDO is a list of proposed times that User B is not otherwise scheduled. Or, consistent with the description in the paragraph immediately above, the CDO may be a list of times that User B is already scheduled, from which the available times can be derived by elimination, or a combination of open and closed times. However CDO is formed, server 170 sends the formed CDO to User A (step 230).

User A's mobile terminal 100 receives the CDO and User A selects a time from the list of times identified based on the information in the CDO (step 240). This may be achieved a variety of fashions. For example, the CDO may cause User A's mobile terminal to present User A with a list of available times for the future communications session with hyperlinks. User A could then select the time by clicking or otherwise selecting the hyperlink corresponding to a particular time. Alternatively, the CDO may cause User A to be presented with a visual representation of a daily calendar broken into time segments, which are optionally of equal length (e.g., fifteen or thirty minutes), with the available times clearly distinguished by appropriate color shading. User A may then select a time from the calendar by cursor navigation, touching the screen, or any other known user input technique. If desired, User A may, in addition to selecting a time, indicate a preferred mode of communication (e.g., voice call, instant messaging, etc.) to be used for the future communications session and/or which party should initiate the communications session. After selection of the desired time by User A, User A's mobile terminal 100 sends a calendar selection message (CSM), which may be a simple message or a more complex object, to server 170 indicating what time has been selected (step 240). User A's mobile terminal 100 may also add the scheduled event to any calendar information stored locally, along with optional reminder information.

In response to receipt of the CSM, server 170 sends a calendaring complete message (CCM) to User B's mobile terminal 100 (step 250). The calendar complete message includes, as appropriate, information about the selected time, which User B's mobile terminal 100 may add the scheduled event to any calendar information stored locally, along with optional reminder information. And, server 170 may also cause the selected time to be reflected on User A's and/or User B's master calendar, particularly if the appropriate master calendar(s) are kept in CAS 180 or server 170.

Then, at the selected future time, User A or User B initiates the planned communication session, with the communication session initiation being either automatic or in response to, for example, a user input prompted by a reminder associated with the event.

It should be noted that either or both of User A and User B may optionally filter their availability used as input to the CDO generation logic by setting priority or ranking of the other party compared to others with whom communication is already scheduled. For example, User B may already have future communications sessions scheduled with User C and User D. If User B has prioritized User A higher than User D, but not User C, then the time period already scheduled for User C will be treated as unavailable, but the time period already scheduled for User D may be treated as available. Note that the prioritization of users may be based, if desired, on inclusion of the particular user in a contact group (e.g., senior management, customers, direct reporting employees, project team X member, etc.), or on an individual basis.

In some embodiments, the STM may also convey information to the server 170 that identifies or otherwise characterizes the type of triggering event that led to the STM. For example, the STM may include an indication of whether the STM was triggered by a "busy", a "reject", or a "not answered." And, based on this information, the server 170 may vary the contents of the CDO. For example, the server 170 may assign User B a lower priority if the STM was triggered by a "reject," than if the STM was triggered by a "busy", in reflection of the likelihood the User A would likely consider it more important to schedule the subsequent communication session with someone who's call request was missed than for someone who's call request was rejected. Of course, various types of triggering events, and corresponding details, may be identified in the STM, as appropriate.

In the illustrative example above, server 170 sends the CDO to User A's mobile terminal 100, and User A selects the desired time. However, in some embodiments, a similar process may be followed, but with the roles of User A and User B reversed for steps 230 onward. Thus, at step 230, server 170 would send the CDO to User B's mobile terminal 100, and User B would select the time for the future communications session, and so forth. It should be noted, particularly with respect to the latter variation of User B selecting, that the selecting step (step 240) need not happen relatively contemporaneously with the non-acceptance of the attempted communications session, but may instead occur several minutes or hours later.

Figure 4:
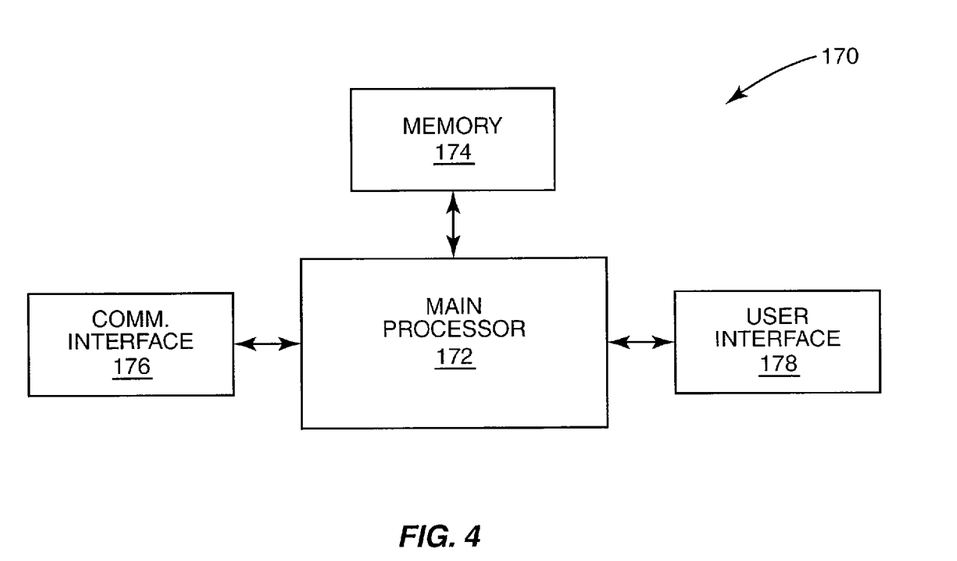
FIG. 4 shows a block diagram illustrating functional components of a server according to one or more embodiments of the present invention.

FIG. 4 illustrates an exemplary server 170 that may help implement the present invention. Server 170 of FIG. 4 comprises a processor 172, memory 174, and a communication interface 176. Processor 172 controls the operation of the application server 170 and may comprise one or more microprocessors, microcontrollers, hardware circuits, or a combination thereof. Memory 174 stores applications executed by processor 172, an may store calendar information or other data in some embodiments. Memory 174 may comprise one or more discrete memory devices, including read-only memory devices, random access memory, flash memory, etc. Memory 174 may further include mass storage devices, such as optical or magnetic storage devices. Stored applications may include operating system applications and/or server applications. Communication interface 176, such an Ethernet interface, connects server 170 to the packet data network 140. Server 170 may further include a user interface 178 to enable maintenance by the operator of the server 170; however, the user interface 178 is not needed for practicing the present invention.

While FIG. 4 illustrates an exemplary server 170 residing a single location, it should be understood that servers 170,180 may be distributed to a plurality of location. Thus, for example, a portion of server 170 may reside in one or both of the mobile terminals 100 of User A and/or User B. Thus, while it may be advantageous if the servers 170,180 are distinct from mobile terminals 100, such is not required in all embodiments of the present invention.

Figure 5:
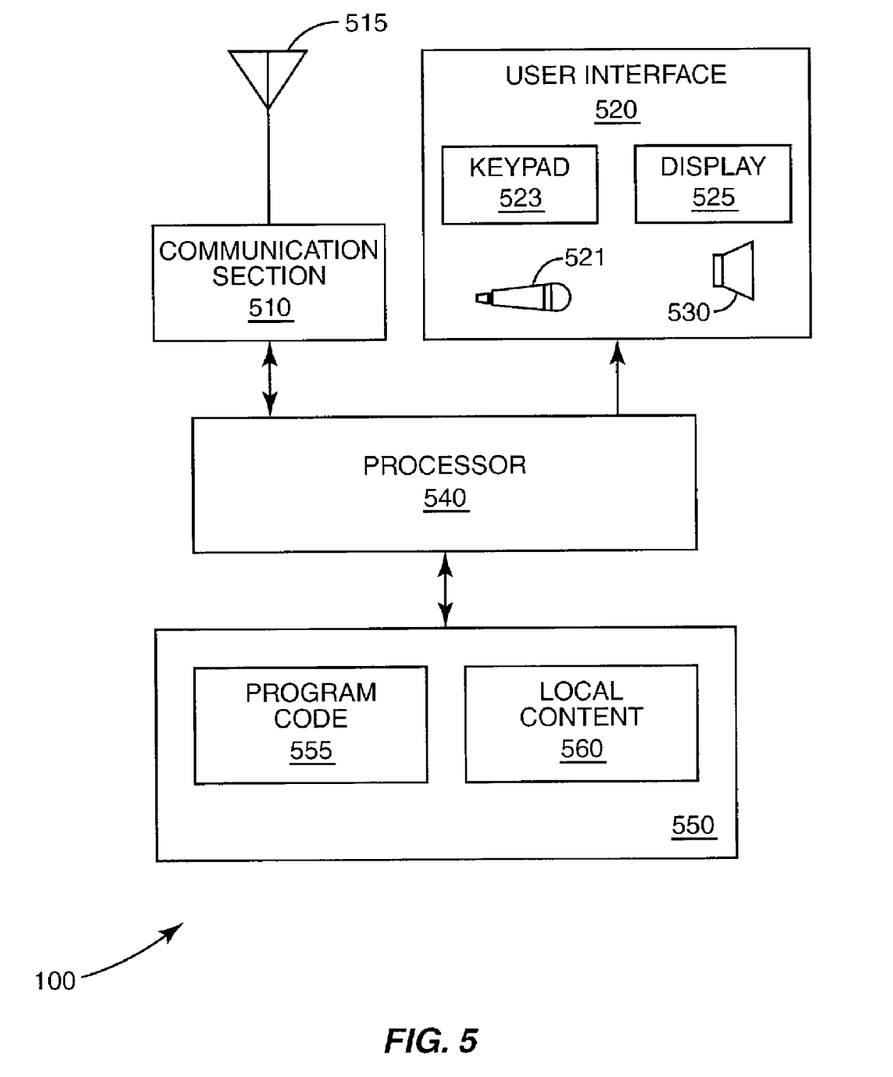
FIG. 5 shows a block diagram illustrating functional components of an exemplary communications device.

FIG. 5 illustrates an exemplary mobile terminal 100 configured to carry out one or more of the methods described above. Mobile terminal 100 comprises a communication section 510 connected to antenna 515; a user interface 520; a processor 540; and memory 550. Processor 540 is responsible for the overall operational control of the mobile terminal 100 according to programs and instructions 555 stored in memory 550. Processor 540 may comprise one or more microprocessors, microcontrollers, hardware circuits, or a combination thereof. Processor 540 is advantageously configured to carry out the methods described herein. Memory 550 stores data, including locally stored calendar data 560, as well as program code 555 needed for operation of mobile terminal 100. Programs stored in memory 550 may include, for example, an operating system program and one or more application programs, including a scheduling application configured to assist the user in scheduling various events, such as communications sessions. Memory 550 may comprise one or more discrete memory devices, including read-only memory devices, random access memory, flash memory, etc. Memory 550 may further include optical or magnetic storage devices.

Communication section 510 may comprise any known type of wireless transceiver to enable communication with other devices. Communication section 510 may comprise, for example, a cellular transceiver operating according to conventional cellular standards, such as GSM and WCDMA, a WiFi transceiver operating according to the 802.11 family of standards, or a Bluetooth transceiver. Mobile terminal 100 could have multiple transceivers, each operating according to a different communication standard.

User interface 520 advantageously includes suitable elements for outputting information to the user and receiving input therefrom. In one embodiment, user interface comprises one or more microphones 521, one or more keypads 523, one or more displays 525, and one or more speakers 530. Typically, microphone(s) 521 and/or keypad(s) 523 receive user input, while speaker(s) 530 and/or display(s) 525 provide suitable output to the user, both in any fashion known in the art. Of course, in some embodiments, keypad 523 and display 525 may be combined in a touch pad input device, or other known input and output elements known in the art, such as scroll and/or select buttons, control knobs, buzzers, etc., may be used. Thus, during a communication session with one or more remote terminals, audio and/or video information may be received by communication section 510, processed by processor 540, and routed to user interface 520 for output at speaker 530 and/or display 525. Likewise, user input may be received at microphone 521 and/or keypad 523, processed by processor 540, and routed to communication section 510 for transmission to one or more remote terminals, or server 170. Just by way of one example relevant to the present description, user interface 520 may alert the user about an incoming communication session request, and receive an input from the user actively rejecting the request, and notify the processor 540 of the same so that appropriate action according to the present invention may be taken.

Those skilled in the art will appreciate that the functional blocks described above, although described with reference to a wireless mobile terminal, may be implemented in any of a variety of network-connected devices. Thus, other communications devices, such as Internet phones, network-enabled personal digital assistants, portable computers, and the like, may be configured as described to provide a method for scheduling a time for a communications session when a called party is presently unable or unwilling to accept an incoming call. Indeed, the present invention may be carried out in several other ways than those specifically set forth herein without departing from essential characteristics of the invention. Accordingly, the present embodiments should be considered in all respects as illustrative and not restrictive, and all changes coming within the meaning and equivalency range of the appended claims are intended to be embraced therein.

What is claimed is:

1. A method for scheduling a subsequent communication session, comprising:
   receiving, at a first communications device associated with a first user, a request for a communication session from a second communications device associated with a second user;
   sending a scheduling trigger message from the first communications device to a server in response to a failure to accept said request, the scheduling trigger message comprising an indication of the failure to accept and an identifier of the second user;
   automatically forming, at said server, a calendar data object responsive to receiving the scheduling trigger message;
   said calendar data object comprising scheduling information indicating one or more future times when said first user is available for a communication session;
   sending said calendar data object to one of said first or second communications devices;
   thereafter, selecting a time from said one or more future times as a selected time at said one of said first or second communications devices;
   thereafter, automatically notifying the other of said first and second communications devices of said selected time via said server.

2. The method of claim 1 wherein said scheduling trigger message further comprises information about said first user's future availability for a subsequent communication session with said second user.

3. The method of claim 1 wherein said server is a first server and wherein said forming said calendar data object comprises retrieving calendar information pertaining to at least one of said first and second users from a calendar application server distinct from said first server.

4. The method of claim 1 further comprising said first user actively rejecting said request between said receiving and said sending.

5. The method of claim 1 wherein an amount of said future times when said first user is available for a communication session indicated in said calendar data object is larger if said second user has a greater priority associated therewith.

6. The method of claim 1 wherein said calendar data object comprises scheduling information that explicitly indicates one or more future times when said first user is available for a communication session by identifying one or more times when said first user is available for a communication session.

7. The method of claim 1 wherein said calendar data object comprises scheduling information that implicitly indicates one or more future times when said first user is available for a communication session by identifying one or more times when said first user is not available for a communication session.

8. A method for scheduling a subsequent communication session comprising:
   receiving a scheduling trigger message at a server requesting said server to assist in scheduling a future communication session between a first user associated with a first communications device and a second user associated with a second communications device; the scheduling trigger message comprising an indication of a trigger event at the first communications device and an identifier of the second user;
   automatically forming, at said server, a calendar data object in response to said scheduling trigger message; said calendar data object comprising scheduling information indicating one or more future times when a first user associated with said first communications device is available for a communication session;
   sending said calendar data object to one of said first and second communications devices;
   receiving a selected time, selected from said one or more future times, from said one of said first and second communications devices;
   automatically notifying the other of said first and second communications devices of said selected time via said server.

9. The method of claim 8 wherein said server is a first server and wherein said forming said calendar data object comprises retrieving calendar information pertaining to at least one of said first and second users from a calendar application server distinct from said first server.

10. The method of claim 8 wherein said scheduling trigger message further comprises information about said first users future availability for a subsequent communication session with said second user.

11. The method of claim 8 wherein an amount of said future times when said first user is available for a communication session indicated in said calendar data object is larger if said second user has a greater priority associated therewith.

12. A server operative to assist in scheduling a subsequent communication session comprising:
   memory for storing a calendar data object;
   a communication interface operative to communicate with first and second communications devices associated with first and second users, respectively; and
   a processor configured to:
      receive a scheduling trigger message, via the communication interface, from the first communications device requesting said server to assist in scheduling a future communication session between the first and second users; the scheduling trigger message comprising an indication of a trigger event at the first communications device and an identifier of the second user;
      automatically form said calendar data object in response to said scheduling trigger message; said calendar data object comprising scheduling information indicating one or more future times when said first user is available for a communication session;
      cause said communication interface to send said calendar data object to one of said first and second communications devices;
      receive a selected time, selected from said one or more future times, from said one of said first and second communications devices;
      notify, via said communication interface, the other of said first and second communications devices of said selected time.

13. The server of claim 12 wherein said server is a first server and wherein said processor is further configured to form said calendar data object by retrieving calendar information pertaining to at least one of said first and second users from a calendar application server remote from said first server.

14. The server of claim 12 wherein said processor is further configured to evaluate a priority associated with the second user when forming said calendar data object.

15. A communications system comprising:
   a first communications device associated with a first user;

a second communications device associated with a second user;

a server;

the first communications device operative to send a scheduling trigger message to the server in response to failure to accept a request for a communication session from the second communications device; said scheduling trigger message comprising an indication of said failure to accept said request and an identifier of said second user;

the server operative to automatically form a calendar data object in response to said scheduling trigger message; said calendar data object comprising scheduling information indicating one or more future times when said first user is available for a communication session;

the server further operative to send said calendar data object to one of said first or second communications devices;

at least one of said first and second communications devices operative to identify a selected time selected from said one or more future times and to supply said selected time to the server;

the server further operative to notify the other of said first and second communications devices of said selected time.

16. The communications system of claim 15 wherein said server is a first server and wherein said first server is operative to form said calendar data object by retrieving calendar information pertaining to at least one of said first and second users from a calendar application server remote from said first server.

17. The communications system of claim 15 wherein said server is operative to evaluate a priority associated with the second user when forming said calendar data object.

18. A wireless communications device associated with a first user and comprising:

a communications section operative to send and receive signals from remote devices via an antenna;

a processor circuit in communication with said communications section and configured to:

receive a request for a communication session from a second communications device associated with a second user via said communications interface;

automatically send a scheduling trigger message to a server in response to failure by said first user to accept said request; said scheduling trigger message comprising an indication of said failure to accept and an identifier of said second user;

thereafter receive, from said server, notice of a selected future time when said first and second users are scheduled for a communication session.

19. The wireless communications device of claim 18 wherein said scheduling trigger message further comprises information about said first user's future availability for a subsequent communication session with said second user.

20. The wireless communications device of claim 18 further comprising a user interface configured to notify said processor circuit of an input from the first user indicating rejection of said request.

* * * * *